United States Patent
Newman et al.

(10) Patent No.: US 11,387,935 B2
(45) Date of Patent: Jul. 12, 2022

(54) ERROR DETECTION AND CORRECTION BY MODULATION QUALITY IN 5G/6G

(71) Applicants: David E. Newman, Palos Verdes, CA (US); R. Kemp Massengill, Palos Verdes, CA (US)

(72) Inventors: David E. Newman, Palos Verdes, CA (US); R. Kemp Massengill, Palos Verdes, CA (US)

(73) Assignee: ULTRALOGIC 6G, LLC, Palos Verdes Estates, CA (US)

( * ) Notice: Subject to any disclaimer, the term of this patent is extended or adjusted under 35 U.S.C. 154(b) by 0 days.

(21) Appl. No.: 17/579,731

(22) Filed: Jan. 20, 2022

(65) Prior Publication Data

US 2022/0140921 A1  May 5, 2022

Related U.S. Application Data

(60) Provisional application No. 63/282,770, filed on Nov. 24, 2021, provisional application No. 63/281,847, (Continued)

(51) Int. Cl.
*H04L 1/00* (2006.01)
*H04L 1/20* (2006.01)
*H04B 17/17* (2015.01)
*H04B 17/18* (2015.01)
*H04B 17/29* (2015.01)
*H04B 17/336* (2015.01)
*H04W 76/18* (2018.01)
(Continued)

(52) U.S. Cl.
CPC .......... *H04L 1/0026* (2013.01); *H04B 17/17* (2015.01); *H04B 17/18* (2015.01); *H04B 17/29* (2015.01); *H04B 17/336* (2015.01); *H04L 1/0003* (2013.01); *H04L 1/0015* (2013.01); *H04L 1/0061* (2013.01); *H04L 1/08* (2013.01);
(Continued)

(58) Field of Classification Search
CPC .............. H04B 17/17–18; H04B 17/29; H04B 17/336; H04L 1/0003; H04W 76/18
See application file for complete search history.

(56) References Cited

U.S. PATENT DOCUMENTS

2007/0089036 A1  4/2007  Jiang
2007/0089037 A1  4/2007  Jiang
(Continued)

*Primary Examiner* — Redentor Pasia
(74) *Attorney, Agent, or Firm* — Mayer & Williams PC

(57) ABSTRACT

Message failures due to noise and interference cause unnecessary delays and reduction in reliability in wireless networks. To detect, localize, and correct transmission faults in 5G and 6G networks, the receiver can measure the "modulation quality" of each message reference element, according to how closely the amplitude and phase match the amplitude and phase levels of the modulation scheme. If the message is faulted, the receiver can re-assign each message element with poor modulation quality to the adjacent states, or if necessary to each state in the modulation scheme, and may thereby find the correct message value in many cases. Certain zones around each modulation state can indicate how the message element has been distorted by interference, and thereby indicate where to search for the correct state of that message element. When implemented, message fault mitigation as disclosed herein can resolve message failures, improve communication reliability, reduce latency, and improve network operations overall, according to some embodiments.

7 Claims, 6 Drawing Sheets

Related U.S. Application Data filed on Nov. 22, 2021, provisional application No. 63/281,187, filed on Nov. 19, 2021, provisional application No. 63/280,281, filed on Nov. 17, 2021, provisional application No. 63/230,926, filed on Aug. 9, 2021, provisional application No. 63/159,238, filed on Mar. 10, 2021, provisional application No. 63/159,195, filed on Mar. 10, 2021, provisional application No. 63/157,090, filed on Mar. 5, 2021, provisional application No. 63/151,270, filed on Feb. 19, 2021.

(51) Int. Cl.
  *H04L 1/08* (2006.01)
  *H04L 5/00* (2006.01)
  *H04L 43/0829* (2022.01)

(52) U.S. Cl.
  CPC ............ *H04L 1/206* (2013.01); *H04L 5/0053* (2013.01); *H04W 76/18* (2018.02); *H04L 43/0829* (2013.01)

(56) References Cited

U.S. PATENT DOCUMENTS

| | | |
|---|---|---|
| 2009/0046771 A1 | 2/2009 | Abe |
| 2010/0097939 A1 | 4/2010 | Yoneta |
| 2012/0311409 A1 | 12/2012 | Pedersen |
| 2013/0163656 A1 | 6/2013 | Sakamoto |
| 2013/0346826 A1 | 12/2013 | Zopf |
| 2014/0376358 A1 | 12/2014 | Eder |
| 2015/0139350 A1 | 5/2015 | Sugihara |
| 2016/0080109 A1 | 3/2016 | Lee |
| 2017/0019210 A1 | 1/2017 | Yu |
| 2017/0134193 A1 | 5/2017 | Sugihara |
| 2017/0288912 A1 | 10/2017 | Rahmati |
| 2017/0311300 A1 | 10/2017 | Stanwood |
| 2017/0331734 A1* | 11/2017 | Cariou .................. H04L 1/1614 |
| 2017/0339692 A1* | 11/2017 | Chun .................... H04L 1/0003 |
| 2018/0270880 A1* | 9/2018 | Hosseini ............... H04W 76/27 |
| 2020/0083983 A1* | 3/2020 | Chen .................... H04L 1/0041 |
| 2020/0112878 A1* | 4/2020 | Liu ....................... H04L 1/1812 |
| 2020/0366409 A1 | 11/2020 | Xu |
| 2020/0394090 A1 | 12/2020 | Urban |
| 2021/0160843 A1* | 5/2021 | Yang .................... H04L 1/0042 |
| 2021/0250049 A1 | 8/2021 | Gabrys |
| 2021/0273651 A1 | 9/2021 | Haftbaradaran |
| 2021/0328598 A1 | 10/2021 | Annamraju |
| 2021/0345169 A1* | 11/2021 | Wang .................. H04W 88/085 |
| 2021/0383207 A1 | 12/2021 | Beery |
| 2022/0060280 A1* | 2/2022 | Gan ..................... H04L 1/0068 |
| 2022/0077968 A1* | 3/2022 | Sugaya .................. H04L 1/189 |

\* cited by examiner

ERROR DETECTION AND CORRECTION BY MODULATION QUALITY IN 5G/6G

PRIORITY CLAIMS AND RELATED APPLICATIONS

This application claims the benefit of U.S. Provisional Patent Application Ser. No. 63/151,270, entitled "Wireless Modulation for Mitigation of Noise and Interference", filed Feb. 19, 2021, and U.S. Provisional Patent Application Ser. No. 63/157,090, entitled "Asymmetric Modulation for High-Reliability 5G Communications", filed Mar. 5, 2021, and U.S. Provisional Patent Application Ser. No. 63/159,195, entitled "Asymmetric Modulation for High-Reliability 5G Communications", filed Mar. 10, 2021, and U.S. Provisional Patent Application Ser. No. 63/159,238, entitled "Selecting a Modulation Table to Mitigate 5G Message Faults", filed Mar. 10, 2021, and U.S. Provisional Patent Application Ser. No. 63/230,926, entitled "Error Detection and Correction in 5G by Modulation Quality", filed Aug. 9, 2021, and U.S. Provisional Patent Application Ser. No. 63/280,281, entitled "Error Detection and Correction in 5G by Modulation Quality in 5G/6G", filed Nov. 17, 2021, and U.S. Provisional Patent Application Ser. No. 63/281,187, entitled "Error Correction by Merging Copies of 5G/6G Messages", filed Nov. 19, 2021, and U.S. Provisional Patent Application Ser. No. 63/281,847, entitled "Retransmission of Selected Message Portions in 5G/6G", filed Nov. 22, 2021, and U.S. Provisional Patent Application Ser. No. 63/282,770, entitled "AI-Based Error Detection and Correction in 5G/6G Messaging", filed Nov. 24, 2021, all of which are hereby incorporated by reference in their entireties.

FIELD OF THE INVENTION

The disclosure includes means for detecting and correcting wireless message errors.

BACKGROUND OF THE INVENTION

Transmission faults are inevitable in wireless communication, due to noise, interference, attenuation, and other distortions. In 5G and 6G, faulted messages are detected according to an error-detection code embedded in the message, and corrupted messages are generally discarded or ignored. The message may then be retransmitted and checked again, leading to further delays. What is needed is means for determining which resource elements of a message are faulted, and means for repairing those faults.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is non-transitory computer-readable media in a receiver, the media comprising instructions that when executed in a computing environment cause a method to be performed, the method comprising: receiving a wireless message, the message comprising modulated message elements, each message element modulated according to a modulation scheme, the modulation scheme comprising a plurality of states, each state modulated according to amplitude modulation or phase modulation or both; determining that the message is faulted; determining, for each message element, a modulation quality according to a difference between the message element and a state of the modulation scheme; altering at least one of the message elements according to the modulation quality of the message element; and determining whether the altered message is faulted.

In another aspect, there is a method for a wireless receiver to mitigate a faulted message comprising message elements, the method comprising: determining a modulation quality of a message element of the message, the modulation quality based on a difference between a modulation of the message element and a first state of a modulation scheme; selecting a message element according to the modulation quality of the message element; altering the message by altering the selected message element to a second state of the modulation scheme; and determining whether the altered message is faulted.

In another aspect, there is a wireless receiver configured to receive a message and an error-detection code, the message comprising one or more message elements, each message element modulated according to a modulation scheme, the modulation scheme comprising amplitude modulation or phase modulation or both, the wireless receiver further configured to: measure, for each message element, a modulation parameter comprising an amplitude or a phase or a combination thereof; allocate, for each message element, a modulation quality according to a difference between the modulation parameter and a state of the modulation scheme; select one or more message elements according to the modulation quality; alter the selected message elements; and compare the message, including the altered message elements, to the error-detection code, and thereby determine whether the altered message is faulted.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
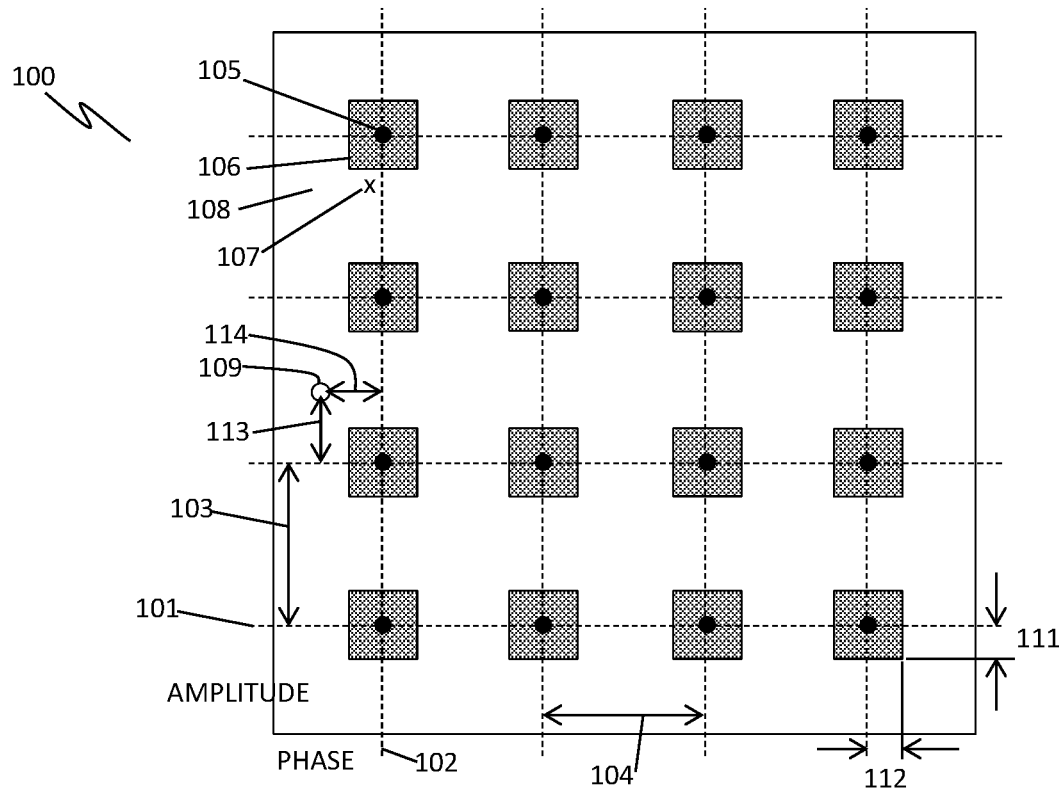
FIG. 1A is a schematic showing an exemplary embodiment of a modulation table for 16QAM, according to some embodiments.

Disclosed herein are procedures enabling a wireless receiver to detect, localize, and correct individual errors in a received message, thereby enhancing reliability and avoiding retransmission delays, according to some embodiments. Systems and methods disclosed herein (the "systems" and "methods", also occasionally termed "embodiments" or "arrangements", generally according to present principles) can provide urgently needed wireless communication protocols to reduce retransmission burdens, improve reliability, and reduce overall delays in networks such as 5G and 6G networks, according to some embodiments. Commonly in wireless communication, interference or noise may distort one or more message elements, resulting in a faulted message reception. Such a message is generally rejected by the receiving entity because the message disagrees with its error-detection code (EDC), such as a CRC (cyclic redundancy code) or a parity construct. However, the faulted message still contains a great deal of information, especially if the fault is restricted to one or a few message resource elements. Systems and methods disclosed herein can provide means for detecting one or more faulted resource elements in a message, and efficient procedures for determining the correct value of those resource elements, thereby providing a low-latency high-reliability solution to message fault problems, according to some embodiments.

Terms used herein generally follow 3GPP (Third Generation Partnership Project) usage, but with clarification where needed to resolve ambiguities. As used herein, "5G" represents fifth-generation and "6G" sixth-generation wireless technology. A network (or cell or LAN or local area network or the like) may include a base station (or gNB or generation-node-B or eNB or evolution-node-B or access point) in signal communication with a plurality of user devices (or UE or user equipment or nodes or terminals) and operationally connected to a core network (CN) which handles non-radio tasks, such as administration, and is usually connected to a larger network such as the Internet. "Receiver" is to be construed broadly, including processors accessible by the recipient of a message, and configured to perform calculations on received signals or messages. Embodiments may include direct user-to-user ("sidelink") communication such as V2V (vehicle-to-vehicle) communication, V2X (vehicle-to-anything), X2X (anything-to-anything, also called D2D or device-to-device) and base station communications or V2N (vehicle-to-network). "Vehicle" is to be construed broadly, including any mobile wireless communication device. The time-frequency space is generally configured as a "resource grid" including a number of "resource elements", each resource element being a specific unit of time termed a "symbol time", and a specific frequency and bandwidth termed a "subcarrier" (or "subchannel" in some references). Each subcarrier can be independently modulated to convey message information. Thus a resource element, spanning a single symbol in time and a single subcarrier in frequency, is the smallest unit of a message. "RNTI" (radio network temporary identity) or "C-RNTI" (cell radio network temporary identification) is a network-assigned user code. "QoS" is quality of service, or priority. "QCI" (QoS class identifier) defines various performance levels. "QPSK" (quad phase-shift keying) is a modulation scheme with two bits per message element, and "16QAM" (quadrature amplitude modulation with 16 states) is a modulation scheme with 4 bits per message element. "SNR" (signal-to-noise ratio) and "SINR" (signal-to-interference-and-noise ratio) are treated equivalently herein.

In addition, the following terms are defined herein. Each modulated resource element of a message is referred to as a "symbol" in references, but this may be confused with the same term for a time interval. Therefore, each modulated resource element of a message is referred to as a "modulated message resource element", or more simply as a "message element", in examples below. A "modulation scheme" is one or more predetermined amplitude levels and one or more predetermined phase levels, which together define an array of "predetermined modulation states of the modulation scheme" or more simply "states", each state representing a resource element modulated according to one of the amplitude levels and one of the phase levels. An "amplitude deviation" of a message element is the difference between its amplitude and the closest amplitude level of the modulation scheme, and likewise the "phase deviation" of a message element is the difference between its phase and the closest phase level of the modulation scheme. The "modulation quality" is a measure of how close the modulation of a message element is to the closest amplitude and phase levels of the modulation scheme, or equivalently how close the modulation of the message element is to the closest state of the modulation scheme. A "demodulation reference" is a set of modulated resource elements that exhibit levels of a modulation scheme (as opposed to conveying data), and each resource element of a demodulation reference is termed a "reference element" herein. A message may be configured "time-spanning" by occupying sequential symbols at a single frequency, or "frequency-spanning" on multiple subcarriers at a single symbol time (also called "frequency-first" if the message continues on multiple symbol times). An "EDC" (error-detecting code) is a field in a message configured to detect faults, such as a "CRC" (cyclic redundancy code) or a parity construct or the like. A message is "unicast" if it is addressed to a specific recipient, and "broadcast" if it includes no recipient address. Transmissions are "isotropic" if they provide roughly the same wave energy in all horizontal directions. A device "knows" something if it has the relevant information. A device "listens" or "monitors" a channel or frequency if the device receives, or attempts to receive, signals on the channel or frequency. A message is "faulted" or "corrupted" if one or more bits of the message are changed relative to the original message. "Receptivity" is the quality of reception of a message. If one or more elements of a "subject" message have been changed when received, the message "fails the EDC test", that is, the embedded error-detection code disagrees with the bit-level content of the message. The fault may have occurred during the modulation step in the transmitter, or in propagation through the air, or at the receive side, and may be due to electronic noise or external interference or atmospheric absorption or scattering or reflection of the electromagnetic wave, to name just a few possible sources of message faults. Amplitude or phase distortion can cause the receiver to incorrectly demodulate the message elements, in which case the message fails the EDC test.

Upon detecting a faulted message, the recipient in 5G/6G can do one of several things. If the recipient knows that the faulted message is intended for it, such as a base station that has scheduled an uplink message at a particular time or a user device receiving a scheduled downlink message, the recipient can request a retransmission after detecting the fault. For most downlink control messages, however, the user device does not know the time or frequency or length of the message, or even if the message is intended for that user device, because in 5G and 6G the downlink control messages are generally scrambled by the recipient's identification code. User devices then perform a "blind search" by attempting to unscramble candidate downlink control messages to locate their messages. However, a faulted message will disagree with its error-detection code, causing the message to appear as intended for some other user device, and would be ignored by the actual recipient. The user device, upon failing to receive the message within a predetermined interval, can request a retransmission, if it is expecting a message. Alternatively, the base station can retransmit the message after failing to receive an expected acknowledgement, among other options. In each case, substantial time is lost, and substantial extra transmission power is wasted, responding to a faulted message. Such delays may be especially critical for low-latency applications such as remote surgery and traffic safety.

In contrast, the methods and systems disclosed herein may enable a user device to recover the faulted message in a fraction of the retransmission time, thereby saving the message, avoiding the retransmission delays, enhancing network reliability, and avoiding adding to the electromagnetic background by avoiding the retransmission, according to some embodiments. As a first example, the systems and methods disclosed herein include a method for mitigating a message fault by determining a modulation quality of each message element. If the message is determined to be faulted, the receiver can alter the "suspicious" message elements (or, more specifically, alter the modulation state that the message element is assigned to) based on modulation quality, and compare the altered message to the error-detection code, as a way of seeking the correct message demodulation.

FIG. 1A is a schematic showing an exemplary embodiment of a modulation table, according to some embodiments. A modulation table represents the states of a modulation scheme as a two-dimensional array, phase horizontally and amplitude vertically. As depicted in this non-limiting example of a modulation table 100, four amplitude levels 101 are shown as dotted horizontal lines, and four phase levels 102 are shown as dotted vertical lines. Each state of the modulation scheme is a multiplexed amplitude and phase modulation, represented here a dot or intersection 105 between one of the amplitude levels 101 and one of the phase levels 102. The amplitude levels 101 are spaced apart by an amplitude step 103, and the phase levels 102 are spaced apart by a phase step 104. Since phase is a circular parameter, the highest and lowest phase levels are separated by one phase step 104, although that may not be obvious in this type of chart.

The modulation scheme in the depicted case is 16QAM, with four amplitude levels 102 and four phase levels 103 and sixteen modulation states indicated by dots 105. Around each modulation state 105 is a rectangular form in dark stipple representing a "good-modulation zone" 106 (or "good-mod" in figures). Each rectangular good-modulation zones 106 is defined by an amplitude level 101 plus or minus an amplitude range 111, and a phase level 102 plus or minus a phase range 112. A message element that is modulated in amplitude and phase within one of the good-modulation zones 106, is assigned to the associated modulation state 105.

The exterior white space 108 is a "bad-modulation zone" (or "bad-mod") in which the modulation of the message element falls outside all of the good-modulation zones, and therefore is invalid or illegal and not used for modulation. For example, a particular message element is received with modulation in amplitude and phase according to a small "x" 107. The phase modulation of the message element x 107 is within the phase range 112 of one of the phase levels 102 of the modulation scheme, but the amplitude modulation is not within the amplitude range 111 of any of the amplitude levels 101. Therefore the message element 107 is declared illegal or bad-mod.

The figure shows another bad-modulation element as an "o" 109. This element has an amplitude deviation 113 relative to the nearest amplitude level 101 as indicated, and a phase deviation 114 relative to the nearest phase level 102. Both the amplitude deviation 113 and the phase deviation 114 are greater than the associated amplitude range 111 and phase range 112. Hence, the message element 109 is flagged as "bad-mod". In some embodiments, the bad-modulation message elements may be assigned to the nearest modulation state 105 initially, although this assumption may be revised later.

After all of the message elements have been assigned to the closest states of the modulation scheme, the message may be checked against an error-detection code which is normally embedded in the message. If the message agrees with the error-detection code, the tentative assignment of the bad-modulation message elements is confirmed, and the message has been successfully demodulated. If not, the message has failed the EDC test, in which case the receiver may attempt to recover the message by altering the bad-modulation message elements. As used herein, "altering" a message element means changing which state of the modulation scheme that the message element is assigned to. After changing the assigned state of the message element, the altered message may be again tested with the error-detection code to see if the altered message is the valid or correct version.

While the figure shows the 16QAM modulation scheme, many other modulation schemes are possible. For example, 64QAM and 256QAM involve additional phase and amplitude levels, whereas QPSK has four phase levels and only a single amplitude level. The difference between a particular message element's modulation and the nearest state of the modulation scheme is a difference in phase only for QPSK, or a difference in phase and/or amplitude for the QAM modulation schemes. In QPSK, demodulation of a message element includes selecting which of the four states of QPSK is closest to the phase of the message element. In QAM schemes, demodulation involves selecting the amplitude level of the modulation scheme closest to the amplitude of the message element, and selecting the phase level of the modulation scheme that is closest to the phase of the message element. In each case, the methods disclosed herein for 16QAM can be applied straightforwardly to each modulation scheme, according to some embodiments.

The figure, and the other examples to follow, are presented according to a standard amplitude-phase modulation scheme, in which the amplitude and phase are modulated separately for each message element. The receiver demodulates a message by determining the amplitude and phase of each message element separately, and compares each amplitude and phase value to the amplitude and phase levels recorded in the calibration set representing the amplitude and phase levels of the modulation scheme. In other embodiments, however, the message may employ pulse-amplitude modulation (PAM), in which two amplitude-modulated signals are added with a 90-degree phase offset between them. Upon receipt, the demodulator then picks out the "real" (zero offset) and "imaginary" (90-degree offset) signals for each of the reference elements and message elements. (The two phase modulations are also sometimes called the "I" or in-phase component and the "Q" or quadrature component. Negative amplitudes correspond to a 180-degree phase rotation.) The receiver then prepares a "constellation" of modulation states from the measured real and imaginary values of the reference elements, each state having a particular real amplitude and a particular imaginary amplitude. The receiver then demodulates the message elements by comparing their real and imaginary values to the real and imaginary levels of the constellation, and thereby determines the modulation state of each message element, as desired. For example, 16QAM with PAM modulation has four real amplitudes and four imaginary amplitudes, which are combined in each message element to yield 16 states overall. The constellation of PAM is equivalent to the calibration set of regular amplitude-phase modulation. The systems and methods described herein are straightforwardly applicable to the real and imaginary modulation levels of PAM. Many other modulation technologies and schemes exist. As long as the modulation scheme involves modulating the phase and/or the amplitude of an electromagnetic wave, it is immaterial which modulation technology is employed. For consistency and clarity, the examples refer to regular amplitude and phase modulation. The principles disclosed herein may apply to each of these modulation technologies, as will be apparent to artisans with ordinary skill in the art after reading the present disclosure.

Figure 1B:
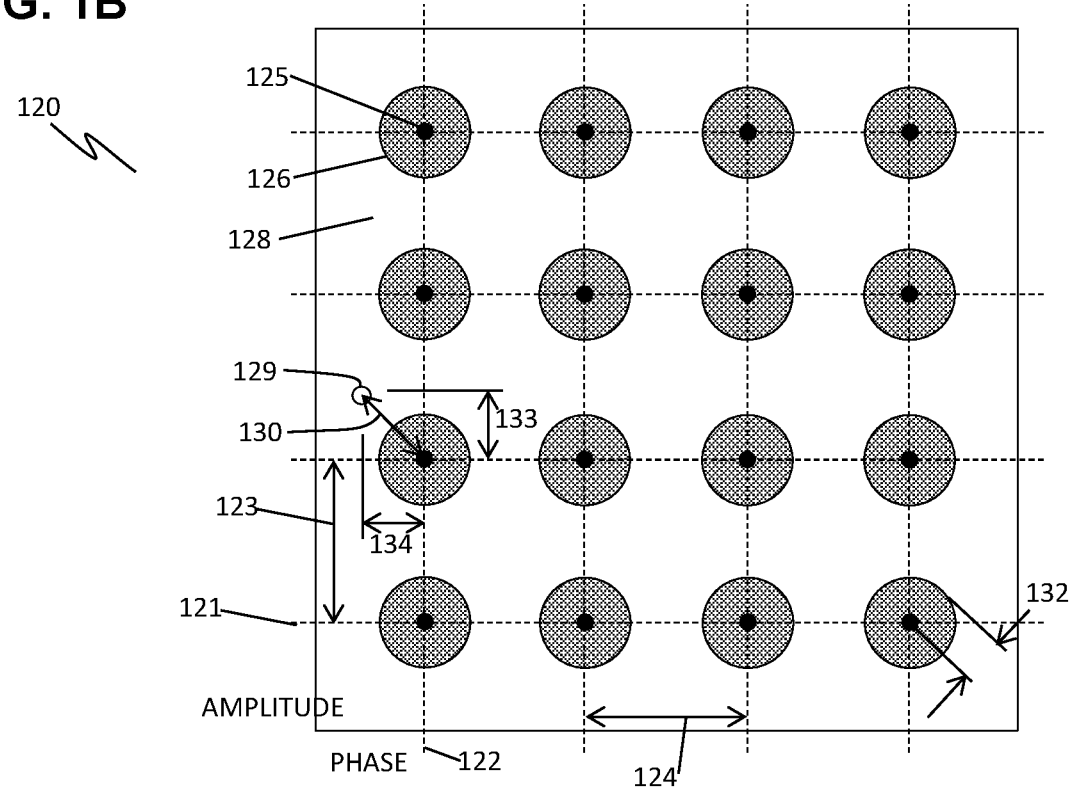
FIG. 1B is a schematic showing another exemplary embodiment of a modulation table for 16QAM, according to some embodiments.

FIG. 1B is a schematic showing another exemplary embodiment of a modulation table for 16QAM, according to some embodiments. As depicted in this non-limiting example, the modulation table 120 may include four amplitude levels 121 separated by the amplitude step 123, and four phase levels 122 separated by the phase step 124, for sixteen states 125. Each state 125 is surrounded in this case by a circular good-modulation zone 126, each with a radius 132 as indicated. The exterior white space 128 represents bad-modulation. A particular message element "o" 129 has an amplitude deviation 133 and a phase deviation 134, and is at a distance 130 (in phase-amplitude space) from the nearest state 125. If that distance 130 is less than the radius 132 of the good-modulation zone, the message element 129 is allocated to "good-modulation". If the distance 130 is greater than the radius 132, then the message element 129 may be flagged as "suspicious" or "bad-modulation" for later mitigation, if needed. In either case, the message element may be assigned to the nearest state 125 for purposes of demodulating the message, although the assignments of the bad-modulation message elements may be altered later if necessary.

The units of phase are generally different from those for amplitude, which may complicate calculating the distance 130. Therefore, for ease of calculation, the measurements may be made unitless by dividing each amplitude deviation 133 by the amplitude step 123, and dividing each phase deviation 134 by the phase step 124. The distance 130 may then be calculated as the square root of the sum of the squares of the amplitude deviation divided by the amplitude step and the phase deviation divided by the phase step.

Figure 2:
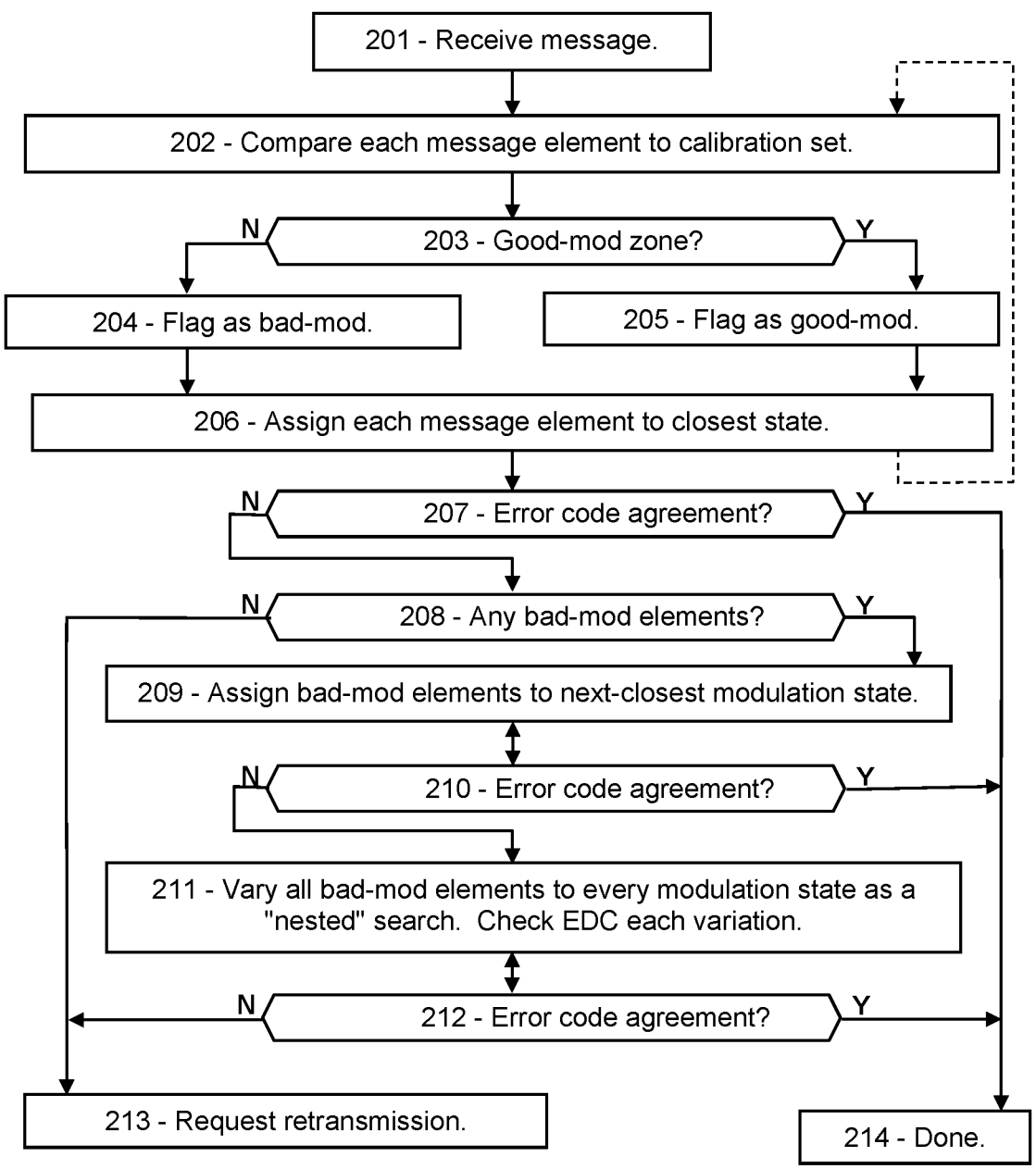
FIG. 2 is a flowchart showing an exemplary embodiment of a process for detecting and correcting message errors, according to some embodiments.

FIG. 2 is a flowchart showing an exemplary embodiment of a process for detecting and correcting message errors, according to some embodiments. As depicted in this non-limiting example, a receiver may receive a message at 201, and may measure the amplitude and phase of each message element at 202, and compare each message element's amplitude and phase values to the amplitude and phase levels of a calibration set, which represents the states of the modulation scheme. At 203, the receiver determines whether each message element's amplitude value falls within a predetermined range of one of the amplitude levels of the modulation scheme, and whether the message element's phase value is within a phase range of one of the phase levels. If so, at 205 the message element is flagged as good-modulation. If the message element's amplitude or phase value is outside the ranges of either the amplitude or phase levels of the modulation scheme (or if the radius is greater than the good-modulation radius), then the message element is flagged as bad-modulation at 204. In either case, at 206 the message element is assigned the nearest modulation state (that is, the nearest amplitude and phase levels) for initially attempting to demodulate the message. The allocations and assignments are repeated for each message element, as suggested by a dashed arrow.

At 207, after assigning each message element to the closest state, the receiver can compare the message to an error-detection code. If there is agreement, the message is assumed to be correctly demodulated, and the task is done at 214. If the message fails the error-detection code, then at 208 the receiver can determine whether the message includes any message elements flagged as bad-modulation. If not, then the receiver may request a retransmission at 213, or other action depending on reception rules and other conditions. If at 208 there is at least one message element flagged as bad-modulation, then at 209, the receiver may alter the assigned state of each bad-modulation element to the next-closest modulation state instead of the closest one. The "next-closest" state is the closest state to the message element's modulation, except the closest one. Some types of noise and interference cause mainly small changes in the amplitude or phase of the message elements, and therefore an economical strategy for recovering the message may be to alter each bad-modulation element by a small amount, testing each such alteration against the error-detection code.

At 210, the message with the altered assignment is tested against the error-detection code, and if there is agreement, the task is done at 214. If not, the receiver may continue altering any remaining bad-mod element assignments to their next-closest state, one at time, and test each alteration. After testing each one of the bad-mod elements individually in this way, the receiver can then alter the bad-mod elements two at a time, testing each alteration for agreement with the error-detection code. If not successful, the receiver can alter the assignments in combinations of three, and other numbers of bad-mod elements, altering each one to the nearest and next-nearest states of the modulation scheme. The receiver can continue varying the bad-mod elements until all possible combinations of the bad-mod elements have been altered to their next-closest state of the modulation scheme, and can test each altered message against the error-detection code. This process is a loop, cycling through steps 209 and 210 repeatedly until all combinations have been tested. However, for clarity in the figure, the steps are shown simply as a command 209 and an interrogator 210, with a double-ended arrow between them. The double-ended arrow indicates that the two steps are to be performed repeatedly and cyclically until all the associated variations have all been tested, and aborting the loop if any of the variations passes the EDC test.

If the message fails the error-detection test for all of the alterations of the bad-mod elements to their closest and next-closest states, the flow proceeds to 211 for a more exhaustive search. Here each of the bad-mod message elements is again altered sequentially, but now they are varied to all of the states of the modulation scheme, instead of being restricted to just the closest and the next-closest states, and each such alteration is tested (skipping the already-tested alterations, however). Each of the bad-mod message elements can be tested sequentially at each of the states, while all of the other bad-mod message elements are also altered in turn. Such a grid search, in which two or more items are independently varied among multiple settings, and all possible combinations are tested, may be termed a "nested" search. For example, if there are B bad-mod message elements and the modulation scheme has S states, the number of combinations is $S^B$ separate tests. If any of those tests results in agreement with the error-detection code at 212, the task is done at 214. If none of the tests is in agreement, at 213 a retransmission is requested. The current message is then abandoned, or, in another embodiment, the message may be retained for analysis when the retransmitted version is received.

In most cases, the time required for a retransmission may be much longer than the time required to alter an assigned modulation state of a message element and compare to the error-detection code, and therefore it may be economical to attempt to repair the faulted message in this way, by altering the state assignments of the message elements having the worst modulation quality, as measured by how far the amplitude and phase values fail to match the levels of the calibration set. However, there is a limit to how many alterations the receiver can test in a given time. If the number of bad-modulation message elements exceeds a threshold number, the receiver may request a retransmission immediately instead of embarking on a probably futile effort to repair the message.

Figure 3A:
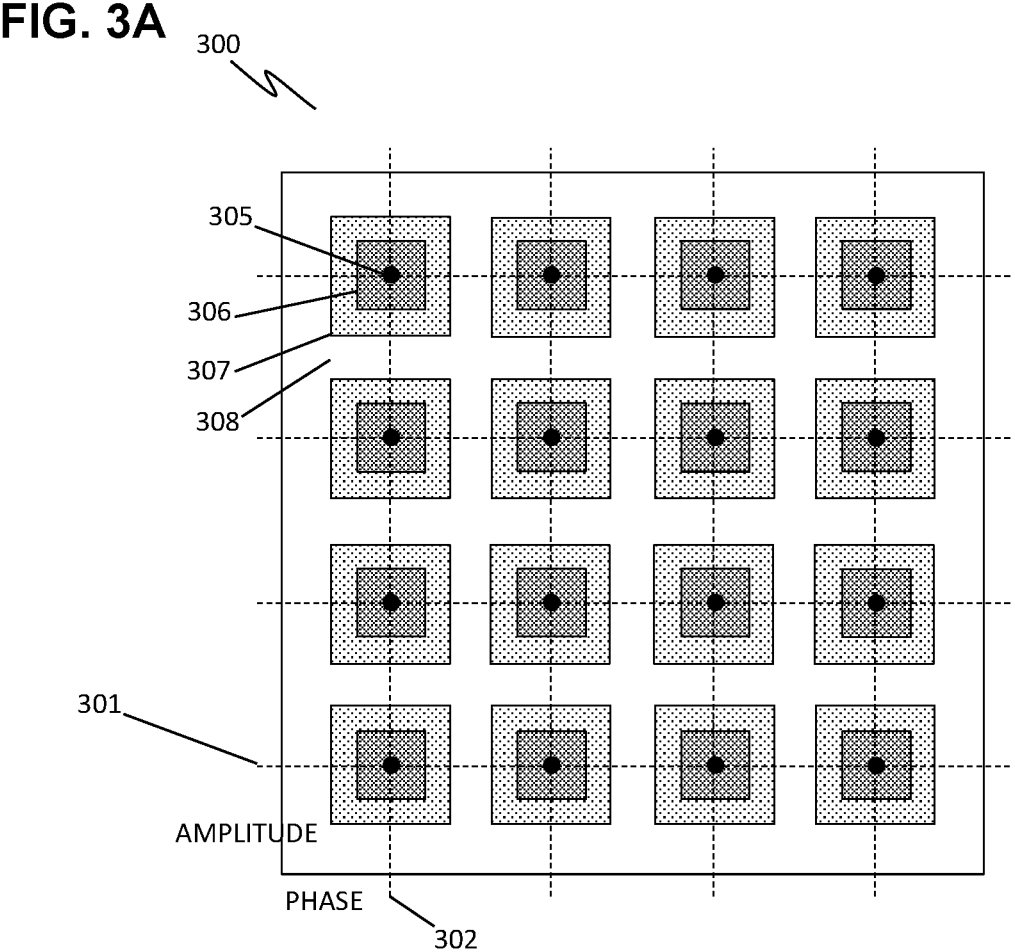
FIG. 3A is a schematic sketch showing an exemplary embodiment of a modulation table with multiple levels of modulation quality, according to some embodiments.

FIG. 3A is a schematic sketch showing an exemplary embodiment of a modulation table with multiple levels of modulation quality, according to some embodiments. As depicted in this non-limiting example, a modulation table 300 (for 16QAM in this case) includes four amplitude levels 301, four phase levels 302, and sixteen states 305. Around each state 305 is a good-modulation zone 306 in dark stipple, surrounded by a marginal (that is, marginal quality) modulation zone 307 in light stipple, and the remaining white space 308 is a bad-modulation zone. A message element with amplitude and phase modulation falling in (or occupying) one of the good-modulation zones 306 may be assigned to the associated state 305 of the modulation scheme. A message element with modulation falling in the marginal-modulation zone 307 may also be assigned to the associated state 305, but with a flag indicating that it is suspicious due to its lower quality of fit to the phase and amplitude levels. A message element with modulation falling in the bad-modulation zone 308 may be assigned to the nearest state 305, but with a flag indicating that it is bad-modulation or very suspicious. If the message is subsequently determined to be faulted, the bad-modulation elements may be altered first, to see whether any alterations may satisfy the EDC test, and if none of those variations succeeds in agreeing with the error-detection code, then the bad-modulation elements and the marginal-modulation elements may be varied together in a nested grid search. The lowest-quality, bad-modulation elements may be varied first because they are the most likely sources of the message failure. If those variations fail to agree with the error-detection code, or if there are no bad-modulation elements, then the message elements with marginal quality modulation may be varied, in combination with the bad-modulation elements. However, in a practical system, if the number of bad-modulation and marginal-modulation elements exceeds a maximum value, the receiver may request a retransmission instead of a search, due to the time and calculational effort required to perform large numbers of variations.

Figure 3B:
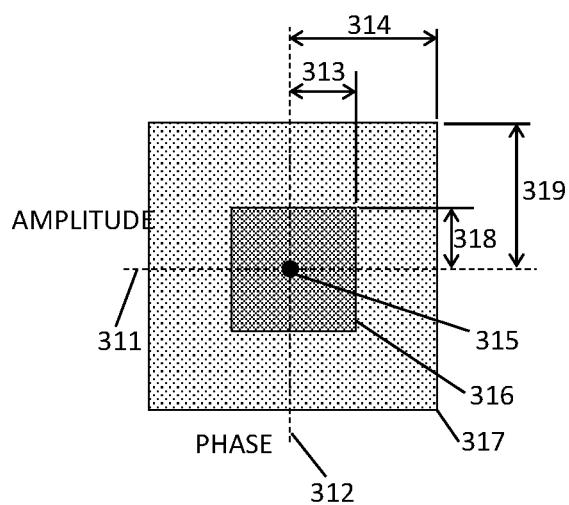
FIG. 3B is a schematic sketch showing an exemplary embodiment of a single modulation state with multiple levels of modulation quality, according to some embodiments.

FIG. 3B is a schematic sketch showing an exemplary embodiment of a single modulation state with multiple levels of modulation quality, according to some embodiments. As depicted in this non-limiting example, a modulation state 315 (such as one of the modulation states of the previous figure) may be configured as the multiplexed amplitude modulation and phase modulation according to an amplitude level 311 and a phase level 312 of the modulation scheme. The modulation state 315 may be surrounded by a good-modulation zone 316, and further surrounded by a marginal-modulation zone 317. The good-modulation zone 316 may be a rectangular region, defined by the amplitude level 311 of the modulation state plus or minus the amplitude range 318, and by the phase level 312 plus or minus the phase range 316. The marginal-modulation zone 317 may be a rectangular region equal to the amplitude level 311 of the modulation state plus or minus the amplitude range 319, and the phase level 312 plus or minus the phase range 314, exclusive of the good-modulation zone 316. Message elements modulated in the good-modulation zone 316 may be assigned the state 315 with high probability. Message elements modulated in the marginal-modulation zone 317 may also be assigned the state 315, but flagged as suspicious. Message elements modulated exterior to the marginal-modulation zone 317 may also be assigned the state 315 if that is the closest one, but may be flagged as likely bad-modulation for the purposes of mitigating faults.

Figure 3C:
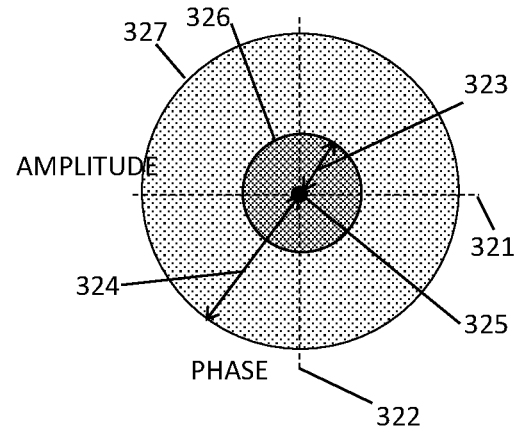
FIG. 3C is a schematic sketch showing another exemplary embodiment of a single modulation state with multiple levels of modulation quality, according to some embodiments.

FIG. 3C is a schematic sketch showing another exemplary embodiment of a single modulation state with multiple levels of modulation quality, according to some embodiments. As depicted in this non-limiting example, a single modulation state 325 at the intersection of an amplitude level 321 and a phase level 322 may be surrounded by a round region of good modulation 326 which may be surrounded by an annular region of marginal quality modulation 327. The radius 323 of the good-modulation region 326 is shown, and the outer radius 324 of the marginal-modulation region 327 is shown. Thus a message element may be allocated to the good-modulation category if the amplitude and phase modulation of the element are such that the modulation falls in the good-modulation zone 326, and likewise for the marginal-modulation zone 327. For example, the "distance" of the message element from the state 325 may be calculated as the square root of the amplitude deviation squared plus the phase deviation squared, and if this distance is less than the good-modulation radius 323 the message element is allocated good modulation quality. If the distance is greater than the good-modulation radius 323 but less than the marginal-modulation radius 324, the message element may be allocated marginal modulation quality. If the distance is greater than the marginal-modulation radius 324, the message element may be allocated bad modulation quality. Alternatively, as mentioned, the ratio of the amplitude deviation divided the amplitude step may be used, and the ratio of the phase deviation divided by the phase step may be used in the distance formula, to eliminate incompatible units.

The foregoing examples involved categorizing message elements into two or three categories according to modulation quality, and altering the message elements in each category. In some embodiments, the receiver may use any number of such categories, not restricted to two or three. In some embodiments, the receiver may eschew categories and may instead select which message elements to alter based on the calculated distance, in phase-amplitude space, of each message element from the closest state. In other embodiments, the receiver may calculate the amplitude deviation and the phase deviation, and may select which message elements to alter based on the amplitude and phase deviations.

Figure 4:
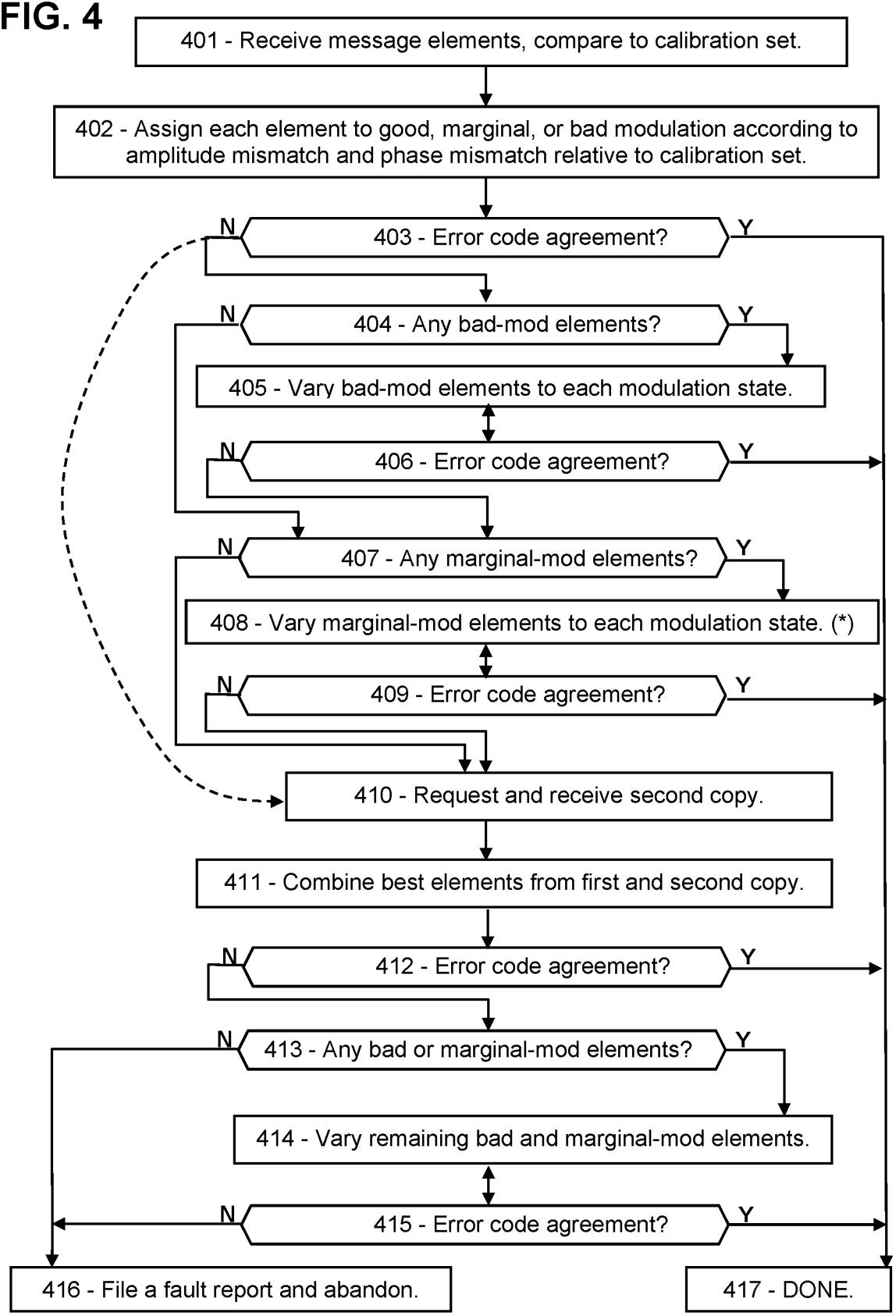
FIG. 4 is a flowchart showing an exemplary embodiment of a process for detecting and correcting message errors using multiple levels of modulation quality, according to some embodiments.

FIG. 4 is a flowchart showing an exemplary embodiment of a process for detecting and correcting message errors using multiple levels of modulation quality, according to some embodiments. As depicted in this non-limiting example, at 401 a receiver receives a message and compares each message element to the amplitude and phase levels previously provided in a calibration set. The calibration set includes the amplitude and phase levels of the modulation scheme, as provided by a demodulation reference, for example. At 402, the receiver assigns each message element to the closest state of the modulation scheme, and also categorizes the modulation quality of each message element as good, marginal, or bad-modulation depending on the distance, in amplitude and phase, of the message modulation to the nearest state of the modulation scheme. After attempting to demodulate the message elements, the receiver compares the message to an error-detection code at 403. If the message agrees with the error-detection code, the task is done at 417. If not, the receiver checks, at 404, whether the message contains any bad-modulation elements, and drops to 407 if not. If the message has at least one bad-modulation element, at 405 the receiver varies the bad-modulation elements among all of the states of the modulation scheme in a nested grid search, as indicated by a double arrow. For example, the receiver may alter the first bad-modulation element successively to each state, while keeping the other bad-modulation elements assigned to their closest states, and may test each variation against the error-detection code. The receiver may perform a similar scan using the second bad-modulation element while keeping all the others at their closest state values, and may continue such a single-element variation until all of the bad-modulation elements have been explored individually. Then, if no match has been found, the receiver may vary combinations of the bad-modulation elements across all of the states, testing all combinations of the bad-modulation elements at all states of the modulation scheme. If any one of those variations satisfies the error-detection code, the message is correctly demodulated and the task is done at 417. If not, the flow proceeds to 407.

At 407, the receiver determines whether the message has any marginal-modulation elements, and if so, it varies the marginal-modulation elements and the bad-modulation elements together in a nested search at 408, as indicated by a double arrow. (The asterisk is explained later.) The receiver can vary the bad and marginal-modulation elements in an exhaustive grid search by setting each of the suspicious elements to each of the states of the modulation scheme, and test the error-detection code for each variation at 409. If any of those variations agrees with the error-detection code, the task is done. If not, or if there are no marginal-modulation elements, the receiver may request and receive a second copy of the message at 410, and may merge the first and second copies by selecting the message elements with the best quality modulation at 411, and then may test the merged version against the error-detection code at 412. If successful, it is done. If not, the flow proceeds to 413.

At 413, the receiver may determine whether the merged message still includes any bad or marginal-modulation elements. The receiver may also note any message elements that differ in the originally received version and the retransmitted version, yet occupy good-modulation zones in each version. Such message elements are termed "paradoxical", and may be flagged as suspicious. If the merged message has no suspicious (bad or marginal or paradoxical) message elements (that is, if the merged message has all good-modulation elements), yet still fails the EDC test, then there is some kind of problem, in which case the receiver may abandon the message at 416 and optionally file a fault report. However, if the merged message has one or more suspicious message elements at 414, the receiver may vary those in another nested search such as described above, testing each variation at 415. If one of those variations agrees with the error-detection code, the task is finally done. If not, the receiver may abandon at 416.

In some embodiments, the receiver may determine the modulation quality as a calculated value, instead of the good-marginal-bad categories. The receiver can then vary the remaining suspicious elements according to the modulation quality value, starting with the message element that has the lowest modulation quality. The receiver can then proceed to vary and test the second-lowest modulation quality message element, and so forth until the error-detection code matches.

In some embodiments, the amount of time required to perform the searches of 406 to 409 may exceed the amount of time to request and receive a second copy of the message, in which case the receiver may request the second copy as soon as the initial version fails the error-detection code, as indicated by a dashed arrow. The receiver may already know how much time it takes to test all combinations given the number of bad and marginal-modulation elements, using an algorithm for example. While waiting for a retransmission, the receiver may continue to test variations, since the receiver might succeed in demodulating the message before the retransmitted message arrives.

In some embodiments, the variations of the marginal-modulation message elements at 408 may be done in two stages for improved efficiency, as indicated by an asterisk (*). Many types of noise cause only small changes in the phase and amplitude of message elements, whereas interference from a nearby transmission can cause a large change in the amplitude or phase of the message element. If the background is due mainly to noise or to low-amplitude interference, the amount of distortion produced upon the amplitude and phase of each message element may be small. In that case, the message elements with marginal quality modulation are likely to belong to the associated state or to one of the adjacent states of the modulation scheme, as opposed to a more distant state that differs by a large amount in amplitude and phase. Therefore, the distortion is more likely to move the amplitude or phase (or both) by one step than a larger number of amplitude or phase steps. The receiver may exploit this by altering each of the marginal-modulation message elements according to its nearest neighbors. For example, each state of the modulation scheme has eight adjacent states if in the middle of the modulation table, or five adjacent states if at the maximum or minimum amplitude. The receiver may save time and enhance the likelihood of finding a solution by testing those eight (or five) nearest-neighbor alterations first, before testing the larger variations across the entire modulation table. If the message has more than one marginal-modulation element, the receiver may perform a nested grid search by altering the assigned state of each of the marginal-modulation message elements to each of their adjacent states, exploring all combinations of all marginal-modulation elements in their adjacent states. If none of those adjacent-neighbor alterations passes the EDC test, then the receiver may proceed to vary the marginal-modulation message elements across the entire set of states of the modulation scheme (preferably skipping the alterations that have already been checked). By testing the most likely combinations of message alterations first, the receiver may avoid a large number of unlikely variations, and may thereby resolve the fault and recover the correct message quickly, according to some embodiments.

The systems and methods disclosed herein further include "directional sectors" defined around each state of the modulation scheme. The directional sectors may indicate how a faulted message may be recovered, according to some embodiments.

Figure 5A:
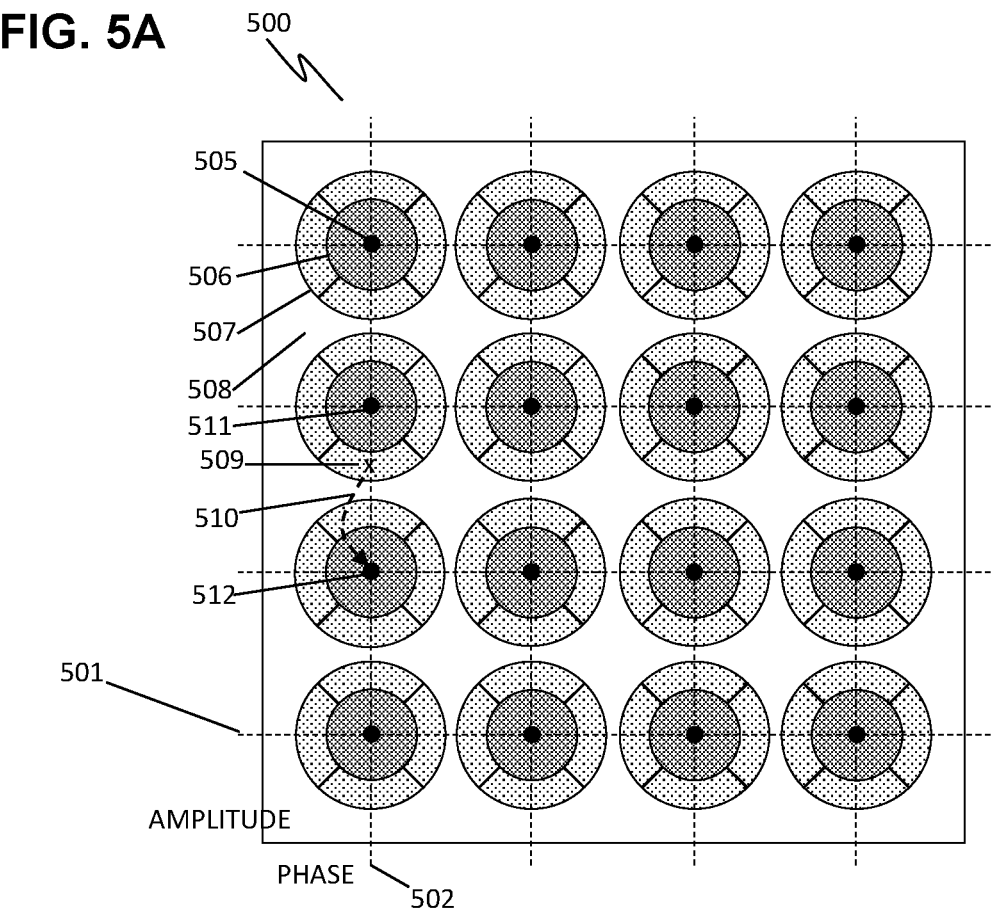
FIG. 5A is a schematic sketch showing an exemplary embodiment of a modulation table for 16QAM with directional deviation sectors, according to some embodiments.

FIG. 5A is a schematic sketch showing an exemplary embodiment of a modulation table for 16QAM with directional deviation sectors, according to some embodiments. As depicted in this non-limiting example, a modulation table 500 with amplitude levels 501 and phase levels 502 define states 505, which are surrounded by a good (quality) modulation zone 506 and a marginal (quality) modulation zone 507 within white space bad (quality) modulation area 508. The marginal-modulation zones 507 are divided into multiple sectors, as explained in more detail in the next figure.

The sectors may assist the receiver in recovering a faulted message. For example, if a message fails the EDC test, the receiver may look for a particular message element modulated in a marginal-modulation zone 507, such as the "x" 509. The message element represented by the "x" 509 is initially assigned to the nearest state which is 511. However, since the message fails the error-detection test with that assignment, and since the "x" message element's modulation quality is only marginal, the receiver may attempt to correct the message by altering the assignment to a different state. For example, the receiver may alter the assignment to the adjacent state in a direction indicated by the sector that the "x" 509 occupies, that is, altering the assignment to the state 512. In the depicted case, the "x" 509 is in a sector directed toward a lower amplitude state with the same phase, and therefore the receiver may attempt altering the message element to the next-lower amplitude 512, as indicated by a dashed arrow 510, and may test that message alteration against the EDC code. Altering the marginal-modulation elements in a direction as indicated by the sector they are in first, before embarking on a wider search, may enhance the probability that the correct state assignment may be determined without having to vary multiple message element assignments across the entire modulation table.

Figure 5B:
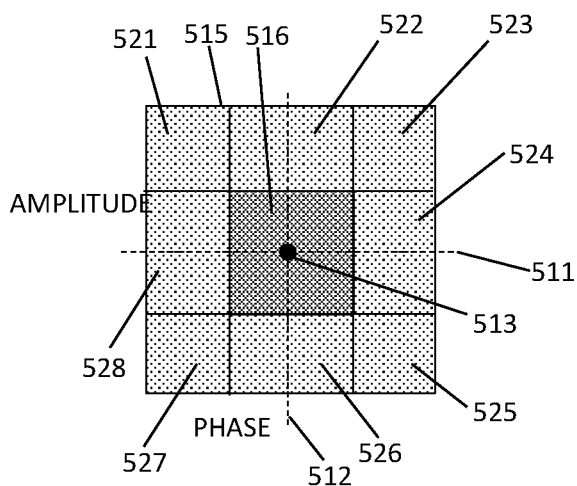
FIG. 5B is a schematic sketch showing an exemplary embodiment of a single modulation state with directional deviation sectors, according to some embodiments.

FIG. 5B is a schematic sketch showing an exemplary embodiment of a single modulation state with directional deviation sectors, according to some embodiments. As depicted in this non-limiting example, a modulation state may include a state 513 including an amplitude level 511 and a phase level 512, with a good-modulation zone 516 surrounded by a marginal-modulation zone 515. The marginal-modulation zone 515 is divided into eight sectors in this case, 521, 522, 523, 524, 525, 526, 527, and 528. The sectors 521-528 may assist the receiver in determining how to modify and recover a faulted message. For example, if the message as-received fails the error-detection code and one of the message elements is modulated according to, say, sector 524, then the receiver may alter that message element to the next-higher phase and test that variation.

In a similar way, a message that fails the error-check code and has a marginal-modulation element in sector 522 may alter the state assignment of that element to the next-higher amplitude state, and may then test that variation. It may be noted that amplitude, unlike phase, does not always have an adjacent state in a specified direction. If the current modulation state 513 is already at the highest amplitude level, then the receiver cannot increase it further, and therefore may ignore the sector information if the occupied sector points in the direction of even higher amplitude modulation. Likewise, if the marginal-modulation element occurs in sector 527, the receiver may alter the message element to an adjacent state with one level lower amplitude and one level lower in phase. However, if the state is already at the lowest amplitude level, then the receiver cannot alter to the next-lower amplitude. As mentioned, phase does not have this limitation because phase is a circular parameter. For example, if the marginal modulation element falls in sector 528 and the element is already in the lowest phase level, then the receiver can alter the assignment to the highest phase level, since the lowest and highest phase levels are separated by just one phase step.

Figure 5C:
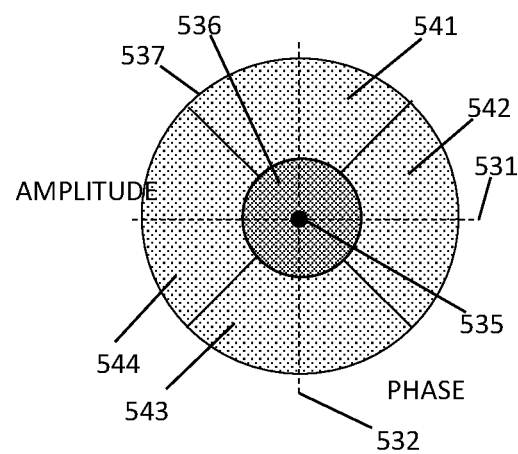
FIG. 5C is a schematic sketch showing another exemplary embodiment of a single modulation state with directional deviation sectors, according to some embodiments.

FIG. 5C is a schematic sketch showing another exemplary embodiment of a single modulation state with directional deviation sectors, according to some embodiments. As depicted in this non-limiting example, a single modulation state of a modulation scheme is indicated as 535 at the intersection of an amplitude level 531 and a phase level 532, surrounded by a good modulation zone 536 and a marginal modulation zone 537 which is divided into four sectors 541, 542, 543, 544. As in the previous example, the receiver may receive a faulted message containing at least one marginal-modulation element, and may attempt to recover the message by altering the state assignment of that marginal-modulation element. Initially, the assignment may be altered to an adjacent state in the direction of the sector in which the message element occurs. By making the most likely alterations first, the receiver may thereby find the correct message quickly, saving time and reducing the calculation burden.

The receiver may thereby use the sector information present in the marginal-modulation elements of a faulted message as a guide for varying the state assignments of those message elements. If those initial small steps fail to agree with the error-check code, then larger variations may be tested before abandoning the message.

In another embodiment, instead of using categories of modulation quality and sectors in the marginal-modulation zone, the receiver may calculate a direction, in phase-amplitude space, based on the amplitude deviation and the phase deviation for example, and may alter a message element with low modulation quality to an adjacent state according to the calculated direction. Basing the initial alteration on the direction of a message element with low modulation quality, relative to the closest state of the modulation scheme, may thereby test the most likely version of the message before attempting a wider search.

Figure 6:
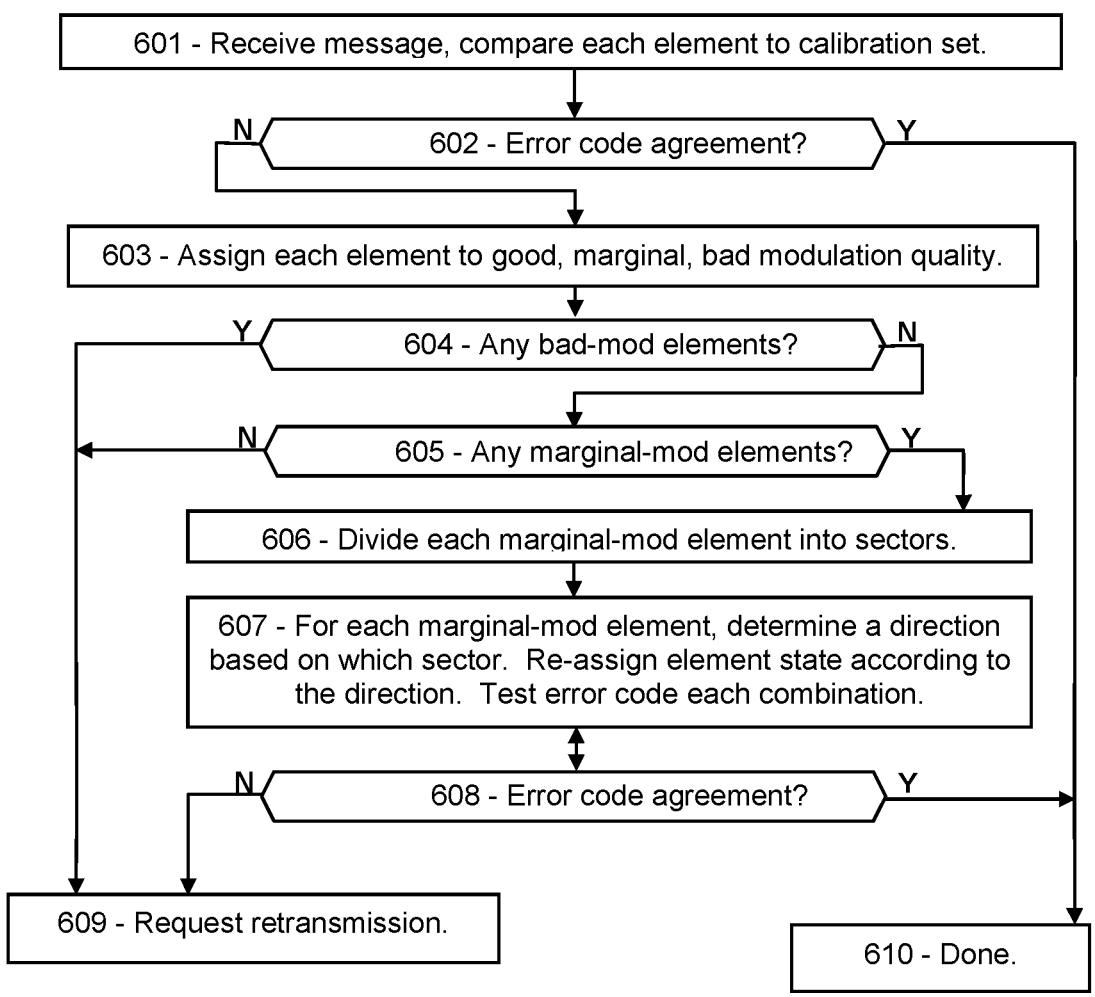
FIG. 6 is a flowchart showing an exemplary embodiment of a process for detecting and correcting message errors according to directional deviation sectors, according to some embodiments.

FIG. 6 is a flowchart showing an exemplary embodiment of a process for detecting and correcting message errors according to directional deviation sectors, according to some embodiments. As depicted in this non-limiting example, a receiver may receive a message at 601, and demodulate each message element using a previously determined calibration set including the amplitude and phase levels of the modulation scheme, At 602, the receiver can compare the message to an embedded error-detection code. If the message passes the EDC test, the task is done at 610. If not, at 603 the receiver may allocate each message element to good, marginal, or bad-modulation zones according to the distance from the modulation of the message element to the nearest state, or according to the nearest amplitude and phase levels. At 604, the receiver determines whether any of the message elements occupies the bad-modulation zone, and if so, the receiver may alter the bad-modulation elements or request a retransmission at 609. If there are no bad-modulation elements, the receiver may determine at 605 whether there are any marginal-modulation elements, in which case the receiver may attempt to recover the message using the sector information. At 606, if not sooner, the receiver may divide each marginal-modulation zone into sectors according to position, and at 607 may determine a direction based on the amplitude and phase deviations of the message element relative to the amplitude and phase levels of the modulation scheme, and may allocate each marginal-modulation message element to one of the sectors. The receiver may then alter each marginal-modulation message element to the adjacent modulation state in the direction indicated by the occupied sector, and may test that variation against the error-detection code. If the altered message passes the error-detection test at 608, the receiver has succeeded in recovering a faulted message and is done. If not, the receiver may request a retransmission and may merge the message with the retransmitted copy, in some embodiments.

In another embodiment, upon receiving a corrupted message, the receiver can calculate a distance value and a direction value according to the modulation of each message element relative to the nearest state of the modulation scheme. To attempt to recover the corrupted message, the receiver can select the message element with the largest distance value, and can alter that message element's state assignment to an adjacent state according to the direction value, and test that altered version against the error-detection code. The receiver can then alter other message element assignments according to their distance values, starting with the largest distance values, and altering each of the message elements to adjacent states according to the direction value. The receiver can perform a nested search among the message elements with distance values exceeding a threshold, for example, testing each such combination. The receiver can begin by altering the message element with the lowest modulation quality, and then proceed to test message elements with successively higher modulation quality. If not successful, the receiver can then alter the message element with the largest distance across all of the states of the modulation scheme, testing each. The receiver can then select further message elements according to distance and vary each according to their direction values or alternatively across the entire modulation scheme, testing each combination. Thus the receiver can select which message elements to alter, and in what order, based on their distance values instead of the good-marginal-bad categories, and the receiver can alter each message element according to the direction value instead of the deviation sectors. In addition, the receiver can calculate how long it will take to perform the alterations, given the number and size of the distance values of the message elements, and can determine whether the amount of time will likely exceed the time required for a retransmission, in which case the receiver may request the retransmission before or concurrently with performing the alterations and tests just described.

The examples provided above disclosed methods for evaluating message elements based on the modulation quality. But in real communications, many factors may affect the fault rate and the types of faults likely to occur, and many other types of information may be gleaned from the message elements. For example, the likelihood that a particular message element is at fault may be determined, in part, by the SNR of the signal received because interference or noise is likely to cause the received signal to exhibit variations that can be measured by the receiver. In addition, interference from transmissions in other cells is often time-shifted due to differences in cell time-bases, signal propagation time, etc. In that case, the effects of interference may show up in the modulated signal of each message element in various ways, such as a stepped transition between modulations of adjacent resource elements instead of a sharp transition. Detection of time dispersion may further indicate which message elements are faulted. In addition, if a message is transmitted with a phase-only modulation scheme such as QPSK, then a message symbol with an amplitude different from the other message elements may be suspicious. The receiver may therefore calculate an overall quality factor for each message element, the overall quality factor including some combination of the modulation distance from the nearest state, the SNR, amplitude anomalies, and other measures of message element quality, for example.

Systems and methods disclosed herein are aimed at improving the error detection capability of receivers in 5G and 6G communications, and to recover faulted messages. The receiver may allocate each message element to a good, marginal, or bad quality of modulation based on how far the element's modulation differs from the amplitude and phase levels of the closest modulation state. The receiver may also divide each marginal-modulation zone into sectors and may vary each marginal-modulation element to an adjacent state in the direction indicated by the occupied sector, to search for the correct modulation state of each message element. Alternatively, the receiver may select which message elements to alter, and how to alter them, according to a distance and a direction of the message element's modulation relative to the closest state of the modulation scheme. The receiver may thereby recover faulted messages that would otherwise be discarded, reducing delays and improving reliability under adverse noise or interference conditions, while avoiding unnecessary requests and retransmissions. As a result, network efficiency may be improved and user satisfaction may be provided with little or no additional cost.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable marginal may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing marginal. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. Non-transitory computer-readable media in a receiver, the non-transitory computer-readable media comprising instructions that when executed in a computing environment cause a method to be performed, the method comprising:
   receiving a wireless message, the message comprising modulated message elements, each message element modulated according to a modulation scheme, the modulation scheme comprising a plurality of states, each state modulated according to amplitude modulation or phase modulation or both;
   determining that the message is faulted;
   determining, for each message element, a modulation quality according to a difference between the message element and a state of the modulation scheme;
   altering at least one of the message elements according to the modulation quality of the message element; and
   determining whether the altered message is faulted;
   wherein the determining the modulation quality comprises:
   measuring a value of the message element, the value comprising an amplitude or a phase or both;
   determining which of the states of the modulation scheme is closest to the message element; and
   determining the modulation quality according to a difference between the message element and the closest state of the modulation scheme, wherein:
   the modulation scheme comprises one or more amplitude levels and one or more phase levels, each state being modulated according to one of the amplitude levels and one of the phase levels respectively; and
   the determining which of the states is closest to the message element comprises determining which of the amplitude levels is closest to an amplitude modulation of the message element, and which of the phase levels is closest to a phase modulation of the message element.

2. Non-transitory computer-readable media in a receiver, the non-transitory computer-readable media comprising instructions that when executed in a computing environment cause a method to be performed, comprising:
   receiving a wireless message, the message comprising modulated message elements, each message element modulated according to a modulation scheme, the modulation scheme comprising a plurality of states, each state modulated according to amplitude modulation or phase modulation or both;

determining that the message is faulted;

determining, for each message element, a modulation quality according to a difference between the message element and a state of the modulation scheme;

altering at least one of the message elements according to the modulation quality of the message element; and determining whether the altered message is faulted;

wherein the determining the modulation quality comprises:

measuring a value of the message element, the value comprising an amplitude or a phase or both;

determining which of the states of the modulation scheme is closest to the message element; and determining the modulation quality according to a difference between the message element and the closest state of the modulation scheme;

selecting a particular message element according to the modulation quality of the particular message element;

altering the particular message element from a first state to a second state of the modulation scheme; and determining whether the altered message is faulted;

wherein the altering the particular message element comprises assigning the particular message element to a next-closest state, the next-closest state being a state of the modulation scheme which is closer to the particular message element than any other state except the closest valid state.

3. Non-transitory computer-readable media in a receiver, the non-transitory computer-readable media comprising instructions that when executed in a computing environment cause a method to be performed, the method comprising:

receiving a wireless message, the message comprising modulated message elements, each message element modulated according to a modulation scheme, the modulation scheme comprising a plurality of states, each state modulated according to amplitude modulation or phase modulation or both;

determining that the message is faulted;

determining, for each message element, a modulation quality according to a difference between the message element and a state of the modulation scheme;

altering at least one of the message elements according to the modulation quality of the message element; and determining whether the altered message is faulted;

wherein the determining the modulation quality comprises:

measuring a value of the message element, the value comprising an amplitude or a phase or both;

determining which of the states of the modulation scheme is closest to the message element; and determining the modulation quality according to a difference between the message element and the closest state of the modulation scheme;

allocating the particular message element to a category in the list of good-modulation, marginal-modulation, and bad-modulation, the allocating based on the modulation quality of the particular message element;

altering one or more of the bad-modulation message elements, and, for each alteration, determining whether the altered message is faulted; and after altering all of the bad-modulation message elements, altering one or more of the marginal-modulation message elements and, for each alteration, determining whether the altered message is faulted;

wherein the altering a particular message element comprises assigning the particular message element to a state of the modulation scheme other than the closest state.

4. Non-transitory computer-readable media in a receiver, the non-transitory computer-readable media comprising instructions that when executed in a computing environment cause a method to be performed, the method comprising:

receiving a wireless message, the message comprising modulated message elements, each message element modulated according to a modulation scheme, the modulation scheme comprising a plurality of states, each state modulated according to amplitude modulation or phase modulation or both;

determining that the message is faulted;

determining, for each message element, a modulation quality according to a difference between the message element and a state of the modulation scheme;

altering at least one of the message elements according to the modulation quality of the message element; and determining whether the altered message is faulted;

wherein the determining the modulation quality comprises:

measuring a value of the message element, the value comprising an amplitude or a phase or both;

determining which of the states of the modulation scheme is closest to the message element; and determining the modulation quality according to a difference between the message element and the closest state of the modulation scheme;

allocating the particular message element to a category in the list of good-modulation, marginal-modulation, and bad-modulation, the allocating based on the modulation quality of the particular message element;

selecting a selected message element from the bad-modulation and marginal-modulation message elements;

determining, for the selected message element, a direction according to the difference between the modulation of the message element and the closest state of the modulation scheme;

altering the selected message element according to the direction; and determining whether the altered message is faulted.

5. The non-transitory computer-readable media of claim 4, wherein the selected message element is assigned to a first state of the modulation scheme, and the altering comprises assigning the selected message element to a second state of the modulation scheme, the second state adjacent to the first state according to the direction.

6. A wireless receiver configured to receive a message and an error-detection code, the message comprising one or more message elements, each message element modulated according to a modulation scheme, the modulation scheme comprising amplitude modulation or phase modulation or both, the wireless receiver further configured to:

measure, for each message element, a modulation parameter comprising an amplitude or a phase or a combination thereof;

allocate, for each message element, a modulation quality according to a difference between the modulation parameter and a state of the modulation scheme;

select one or more message elements according to the modulation quality;

alter the selected message elements; and compare the message, including the altered message elements, to the error-detection code, and thereby determine whether the altered message is faulted;

wherein the modulation quality of a particular message element comprises a mathematical combination of a difference in amplitude between the particular message element and the state, and a difference in phase between the particular message element and the phase.

7. The wireless receiver of claim 6, further configured to:

determine a direction according to the difference in amplitude between the particular message element and the state, and the difference in phase between the particular message element and the state;

alter the particular message element according to the direction; and then determine whether the altered message is faulted.

\* \* \* \* \*